UNITED STATES PATENT OFFICE.

OSCAR GÜNTHER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

BROWN TETRAZO DYE.

1,019,321. Specification of Letters Patent. Patented Mar. 5, 1912.

No Drawing. Application filed July 13, 1911. Serial No. 638,309.

*To all whom it may concern:*

Be it known that I, OSCAR GÜNTHER, doctor of philosophy, chemist, citizen of the German Empire, residing at Elberfeld, Germany, have invented new and useful Improvements in Brown Tetrazo Dye, of which the following is a specification.

My invention relates to the manufacture and production of a new disazo dye which is obtained by combining the tetrazo compound of para-para'-diaminodiphenylurea-meta-meta'-disulfonic acid.

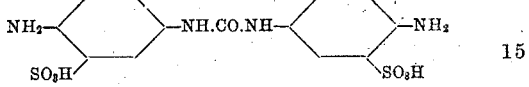

with two molecules of meta-phenylenediamin

The new dye having most probably the formula:

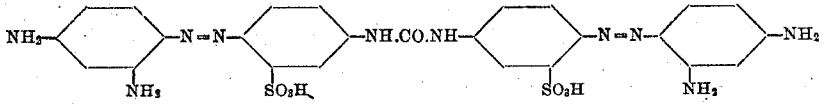

is after being dried and pulverized in the shape of its sodium salt a dark powder which is soluble in concentrated sulfuric acid with a reddish-violet coloration; yielding upon reduction with stannous chlorid and hydrochloric acid 1.2.4-triaminobenzene and 4.4'-diaminodiphenylurea-3.3'-disulfonic acid which is split up into $CO_2$ and paraphenylenediamin sulfonic acid. The new coloring matter dyes cotton directly a yellow-brown, which when developed with diazotized para nitranilin changes into a full reddish-brown which can be discharged to a pure white and is of excellent fastness to washing and to light.

The following example is given, the parts being by weight:—402 parts of the tetrazo compound obtained from para-para'-diaminodiphenylurea-meta-meta'-disulfonic acid by tetrazotizing this compound with sodium nitrite and ClH (see United States Letters Patent No. 687171 of Nov. 19, 1901) are allowed to run into a weak alkaline solution of 216 parts of metaphenylenediamin. The dye is salted out with common salt filtered off and dried.

I claim:—

The herein described new tetrazo dyestuff having most probably the formula:

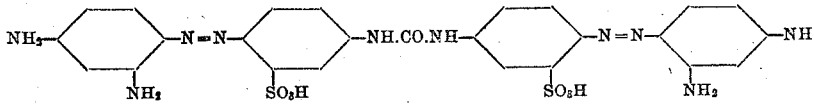

which is after being dried and pulverized in the shape of its sodium salt a dark powder soluble in concentrated sulfuric acid with a reddish-violet coloration; yielding upon reduction with stannous chlorid and hydrochloric acid 1.2.4-triaminobenzene and 4.4'-diaminodiphenylurea-3.3'-disulfonic acid which latter compound is further split up into $CO_2$ and para-phenylenediamin sulfonic acid; dyeing cotton directly a yellow brown, which when developed with diazotized para-nitranilin changes into a full reddish-brown which can be discharged to a pure white and is of excellent fastness to washing and to light, substantially as described.

In testimony whereof I have hereunto set my hand in the presence of two subscribing witnesses.

OSCAR GÜNTHER. [L. S.]

Witnesses:
ALBERT F. NUPER,
ALFRED HENKEL.